UNITED STATES PATENT OFFICE.

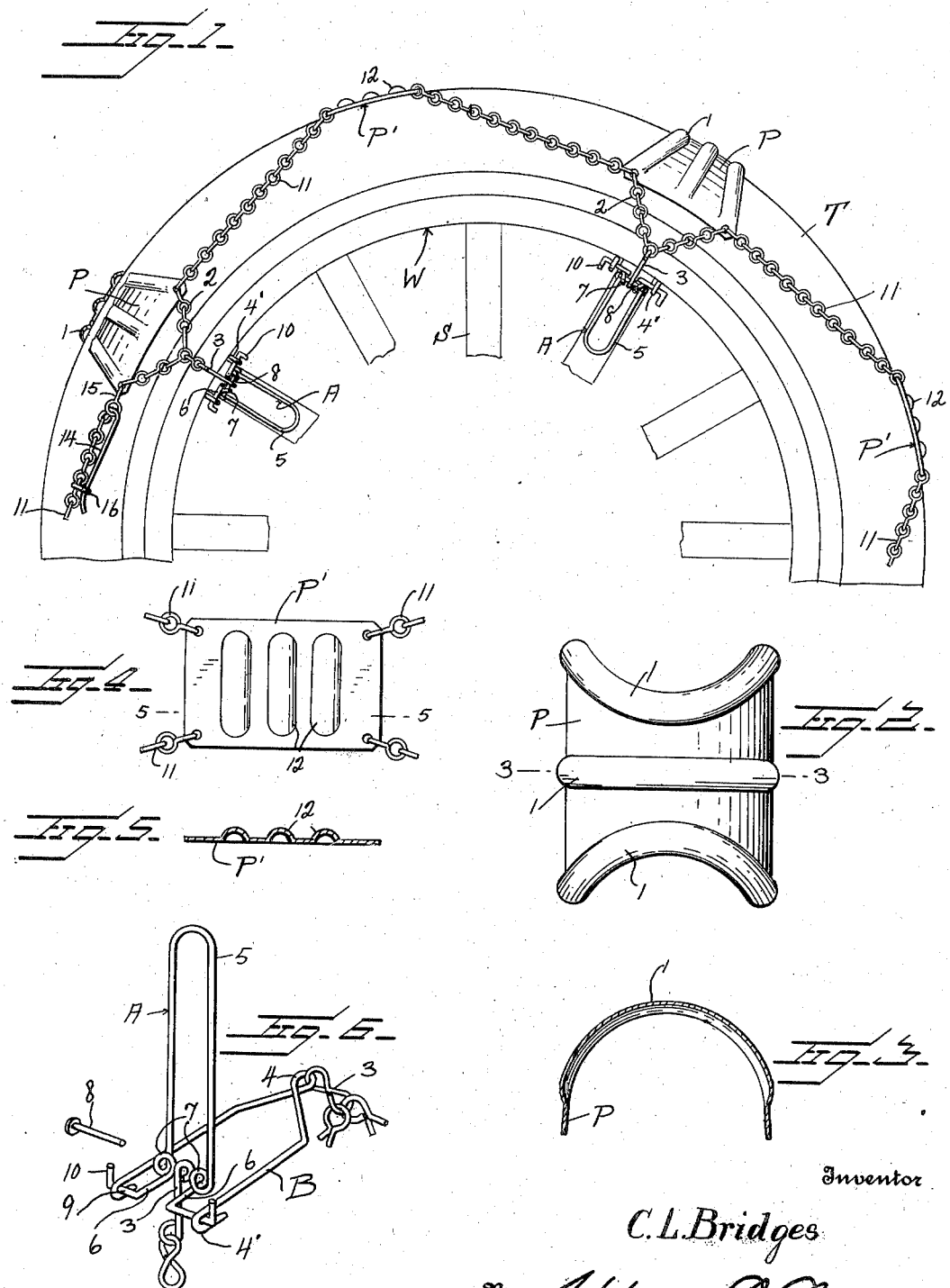

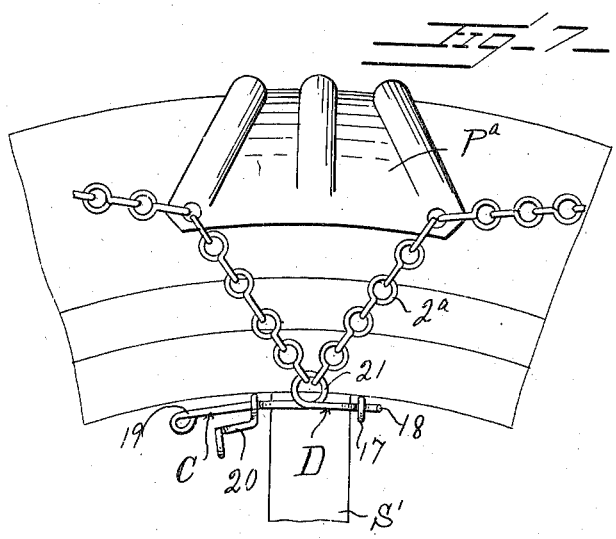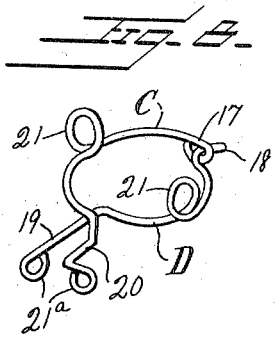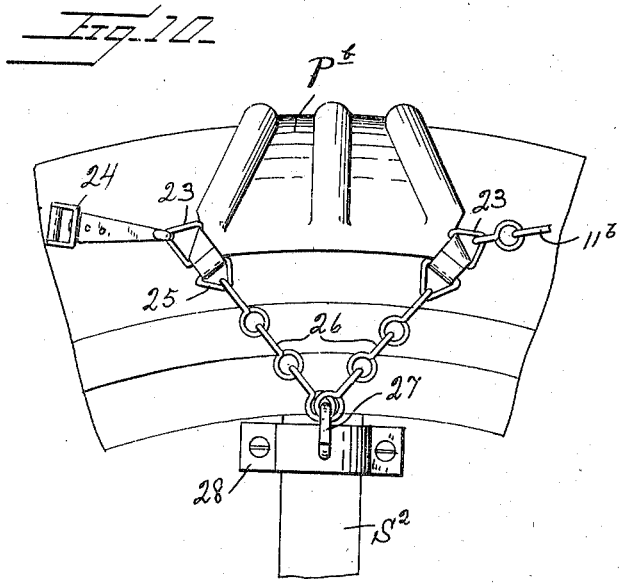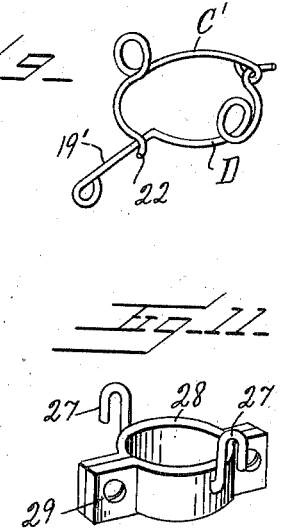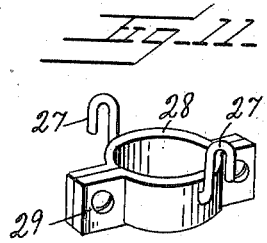

CLYDE L. BRIDGES, OF ALTUS, OKLAHOMA.

WHEEL-TREAD.

1,315,278.  Specification of Letters Patent.  Patented Sept. 9, 1919.

Application filed January 8, 1919. Serial No. 270,173.

*To all whom it may concern:*

Be it known that I, CLYDE L. BRIDGES, a citizen of the United States, residing at Altus, in the county of Jackson and State of Oklahoma, have invented certain new and useful Improvements in Wheel-Treads, of which the following is a specification, reference being had to the accompanying drawings.

This invention relates to wheel treads, and it is an object of the invention to provide a device of this general character having novel and improved means whereby the same may be employed with convenience and facility to substantially eliminate a wheel to which the device is applied from slipping, skidding or sticking in muddy or wet roads.

It is also an object of the invention to provide a novel and improved device of this general character which may be effectively maintained in applied position, and which is substantially free of noise.

An additional object of the invention is to provide a novel and improved device of this general character which coacts with the tread portion of the tire of a wheel, and wherein fastening means for the device are employed which are adapted for connection directly with the body of the wheel, and more particularly spokes comprised in such body, so that the spinning or rotation of the wheel that the tread member is prevented, and whereby the possibility of the tread portion of the tire being burned by the heat generated by friction is eliminated.

It is also an object of the invention to provide a novel and improved tread member which, when in applied position, serves to reduce to a minimum the possibility of a rim cut in the event the tire should become deflated, together with means whereby the tread member is maintained in applied position in such event the tire is deflated.

The invention consists in the details of construction and in the combination and arrangement of the several parts of my improved wheel tread whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation of a tread member constructed in accordance with an embodiment of my invention in applied position;

Fig. 2 is a view in plan of one of the transverse plates comprised in my improved tread member;

Fig. 3 is a sectional view taken substantially on the line 3—3 of Fig. 2;

Fig. 4 is a view in plan of one of the intermediate plates comprised in my improved tread member as herein disclosed;

Fig. 5 is a sectional view taken substantially on the line 5—5 of Fig. 4;

Fig. 6 is a view in perspective of the fastening member as disclosed in Fig. 1, with the pintle or pivotal member shown in an unapplied position;

Fig. 7 is a fragmentary view in elevation illustrating a slightly modified form of my invention, and as particularly relates to the wheel or spoke engaging means;

Fig. 8 is a view in perspective, detached, of the wheel or spoke engaging means shown in Fig. 7;

Fig. 9 is a view in perspective, detached, of a wheel or spoke engaging member embodying a modified construction, but of the same general type as illustrated in Fig. 8;

Fig. 10 is a fragmentary view in elevation illustrating a still further embodiment of my invention; and Fig. 11 is a view in perspective of the wheel or spoke engaging means in the form of invention illustrated in Fig. 10.

As particularly illustrated in Figs. 1 to 6 of the accompanying drawings, W denotes a wheel body including the spokes S, and which has mounted thereon in a conventional manner a tire T preferably of a pneumatic type.

My improved tread member comprises a plurality of plates P curved to conform to the transverse peripheral configuration of the tread portion of the tire and adapted to bridge such tread portion when in applied position. The plate P is preferably formed of metal, and has its opposite ends and its central portion provided with outstanding reinforcing ribs 1 preferably pressed outwardly from the plate P. The opposite end portions of each side extremity of the plate P have secured thereto the extremities of a flexible member 2 preferably a chain, and secured midway of said member 2 is a link 3 adapted for engagement with a member of a wheel body or spoke engaging member.

The wheel body or spoke engaging means is particularly illustrated in Fig. 6, and said means comprises two relatively movable members A and B. The member B is substantially U-shaped in form, and has its base portion provided substantially centrally thereof with an eye 4 with which one of the links 3 is engaged. The free extremities of the member B are provided with the inwardly facing hook members 4'.

The member A comprises an elongated and substantially U-shaped member 5 having its free end portions outwardly and laterally directed to afford the substantially parallel arms 6. The member 5 at its junction with the arms 6 is provided with the eyes 7 through which a pivotal pin or pintle 8 is adapted to be disposed, and this pivotal member or pintle 8 is also directed through an end portion of the second link 3. The outer extremity of each of the arms 6 is provided with an outwardly and laterally disposed extension 9 terminating in a substantially perpendicularly related finger 10.

The member B is adapted to straddle a spoke S, and after which the extensions 9 of the arms 6 of the member A are engaged within the inwardly facing hooks 4' with the member 5 disposed in a direction toward the tire T. The member 5 is then swung in a direction toward the spoke S which results in an effective engagement with the spoke. The releasing operation is reverse to the operation just explained.

The corner portions of each of the plates P have secured thereto the extremities of the flexible members 11, preferably chains, and the opposite extremities of said members are secured to the corner portions of an intermediate plate P' which is substantially flat and rests upon the central part of the tread portion of the tire T. When my improved tread member is in applied position, the flexible members or chains 11 are substantially taut, which results in the various plates P' being effectually maintained in applied position. In order to strengthen the plate P' and to provide means whereby it may effectually grip the surface over which the wheel structure W travels, I provide said plate P' with a plurality of transversely disposed and preferably parallel ribs 12, preferably pressed outwardly therefrom. It will also be understood that the ribs 1 of the plates P hereinbefore referred to, serve to assure the requisite gripping action of said plates P upon the surface over which the wheel structure W travels, and it will also be understood that the particular arrangement of said ribs 1 serves to prevent slipping of the wheel structure W and also to prevent skidding.

In order to maintain the tread member in its entirety upon the wheel structure W, certain of the members 11 have their extremities pivotally engaged with a lever 14 adapted to be inserted, preferably, through a link 15 secured directly to a plate P. Said lever is then swung backwardly to overlie the member 11 and held in such position through the medium of a ring 16 loosely mounted upon the member 11 and adapted to be disposed over the free end portion of the lever 14, as is particularly illustrated in Fig. 1 of the accompanying drawings.

In view of the foregoing, it is to be noted that my improved tread member in its entirety is maintained in applied position upon the tire T by direct connection with the wheel body or more particularly the spokes comprised therein, and in a manner whereby the tread member is held against rattle and is thereby rendered noiseless in view of the fact that the tread member is held snugly upon the tire T. It will also be noted that by having the tread member connected with the spokes S, the wheel body or structure W is prevented from turning or spinning independently of the tread member, so that burning of the tire T as a result of friction offered by the tread member is eliminated. It will also be obvious that my improved tread member can be conveniently and readily applied to the wheel and without the necessity of jacking the car off of the ground, as the holding connections are made with the spokes S, with the result that the maintenance of the tread member in applied position does not depend upon the connection of the end portions of the tread member. It has also been fully demonstrated in practice that with my improved tread member the possibility of the same kinking or becoming loose on one side is eliminated, and it has been further demonstrated that the strain will be evenly distributed about the entire wheel body or structure W. With my improved wheel tread, a vehicle may be readily extracted from mud or from sand, as the possibility of a wheel spinning is substantially eliminated. My improved tread member is also particularly advantageous in facilitating travel up an incline of high grade, as the plates P and P' will effectively grip or engage the surface over which the wheel structure or body is traveling. It has also been fully demonstrated in practice that my improved tread member can be employed with advantage as a snow tread.

In the form of invention particularly illustrated in Figs. 7 and 8, the plate P$^a$ is substantially the same as has been set forth relative to the plate, P, but the distinctive difference lies in the means for securing the flexible members 2$^a$ to a spoke S'. As is particularly illustrated in Fig. 8, the securing or fastening means comprises two relatively movable members C and D, each substantially semi-circular in form. One of the members as C is provided at one extremity with an eye 17 through which is disposed an angular end portion 18 of the second section D. The opposite end portion of the section D is provided with a substantially radial extension 19 with which coacts an angular extension 20 carried by the second end portion of the member C. The central portion of each of the members C and D is provided with an upstanding eye member 21 with which the flexible members 2ª at one side of a plate Pª are engaged. The members C and D are adapted to embrace a spoke S' and with the angular end portion 20 of the member C overlying the radial extension 19 of the member D, it will be at once self evident that an effective engagement will be had with the spoke. When it is desired to release the members C and D from the spoke S', it is only necessary to exert pressure upon the angular portion 20 and the extension 19, and for which reason the free ends of said parts are provided with the loops 21' to facilitate such operation.

The fastening or spoke engaging means illustrated in Fig. 9 is substantially the same as that disclosed in Fig. 8 except that an end of the member C' is provided with a hook 22 for engagement over the radial extension 19' of the member D'.

In the embodiment of my invention as particularly illustrated in Figs. 10 and 11, the plate Pᵇ is also substantially the same as has been set forth relative to the plates P except that the corners thereof have hingedly or pivotally engaged therewith the substantially triangular members 23 with each of which is engaged a flexible member 11ᵇ or a fastening hook 24 or the like carried by an end flexible member 11ᵇ (not shown).

The corners of the plate Pᵇ are also provided with the additional triangular members 25 extending inwardly of the wheel body or structure and to which are engaged the flexible members 26. The outer or free extremities of the members 26 are adapted to be engaged with the inwardly facing hook members 27 carried by the clamping members 28.

Each of the clamping members 28 is provided with a central portion substantially semi-circular in form so that the members 28 may be readily disposed around a spoke S² and coacting with the opposite end portions of the members 28 are the screws or bolts 29 so that the members 28 may be effectually engaged with the spoke S².

From the foregoing description, it is thought to be obvious that a wheel tread constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A tread member of the class described comprising a plurality of plates curved to conform to the tread portion of a tire, and of a length to overlie the side portions of a tire, additional plates positioned intermediate the first named plates, flexible connections connecting the corners of each of the first named plates and the corners of the second named plates at opposite sides of the first named plates, and means for securing the opposite side extremities of each of the first named plates to a wheel structure.

2. In combination with a wheel structure including spokes and a tire mounted upon said wheel structure, a tread member for said tire comprising plates bridging the tread portion of the tire and overlying the sides of the tire, means for securing the opposite sides of said plates to certain of the spokes of the wheel structure, plates overlying the tread portion of the tire and positioned intermediate the first named plates, and flexible members connecting the first named plates and the intermediate plates.

3. In combination with a wheel structure including spokes and a tire mounted upon said wheel structure, a tread member for said tire comprising plates bridging the tread portion of the tire and overlying the sides of the tire, means for securing the opposite sides of said plates to certain of the spokes of the wheel structure, plates overlying the tread portion of the tire and positioned intermediate the first named plates, and flexible members connecting the first named plates and the intermediate plates, the means engaging the spokes being readily detachable from the spokes.

In testimony whereof I hereunto affix my signature in the presence of two witnesses.

CLYDE L. BRIDGES.

Witnesses:
J. E. SMITH,
JAS. J. LEWIS.